United States Patent [19]

Ranson

[11] Patent Number: 5,126,554
[45] Date of Patent: Jun. 30, 1992

[54] IMAGING DEVICE USING MULTIPLE AREA SENSORS

[75] Inventor: John H. L. Ranson, Ruthin, United Kingdom

[73] Assignee: Pilkington P.E. Limited, North Wales, United Kingdom

[21] Appl. No.: 549,406

[22] Filed: Jul. 6, 1990

[30] Foreign Application Priority Data

Jul. 12, 1989 [GB] United Kingdom ............... 8915982

[51] Int. Cl.$^5$ ..................... H01J 3/14; G02B 27/14
[52] U.S. Cl. ................... 250/216; 250/208.1;
250/578.1; 250/370.08; 250/332; 359/634;
359/639; 358/225
[58] Field of Search ............. 250/578.1, 216, 208.1,
250/226, 370.06, 370.08, 332; 350/173, 171, 3.7,
286; 358/225, 213.13

[56] References Cited

U.S. PATENT DOCUMENTS

| 4,092,531 | 5/1978  | Moss           | 250/216 |
| 4,129,358 | 12/1978 | Wei            | 350/173 |
| 4,272,684 | 6/1981  | Seachman       | 358/225 |
| 4,383,170 | 5/1983  | Takagi et al.  | 250/216 |
| 4,516,032 | 5/1985  | Barr           | 250/216 |
| 4,543,601 | 9/1985  | Hasada et al.  | 250/216 |
| 4,916,529 | 4/1990  | Yamamoto et al.| 350/173 |
| 4,933,751 | 6/1990  | Shinonaga et al.| 350/173 |
| 4,970,403 | 11/1990 | Krasutsky      | 250/216 |

FOREIGN PATENT DOCUMENTS 1472827 5/1977 United Kingdom .

Primary Examiner—David C. Nelms
Assistant Examiner—Michael Messinger
Attorney, Agent, or Firm—F. Eugene Davis, IV

[57] ABSTRACT

An imaging device for processing an optical image in the visible and/or infra-red wavelength bands. An optical image receiving area is divided into four segments and each segment is associated with an optical sensing means in the form of a semiconductor chip comprising a plurality of pixels. Each segment also includes a reflection means for reflecting the particular optical image to the associated optical sensing means. The reflecting means preferably takes the form of a reflecting surface within a cube comprising two prisms. The reflecting surface may be fully reflecting dichroic or holographic. A further optical sensing means in the form of a semiconductor chip is employed to the rear of the image receiving areas and is positioned to sense for small separate segments of the four guarter segments in the center of the overall optical image. All the separate received optical images are processed electronically to produce a composite image.

22 Claims, 2 Drawing Sheets

IMAGING DEVICE USING MULTIPLE AREA SENSORS

BACKGROUND OF THE INVENTION

The present invention relates to an imaging device for processing an image in the visible and infra-red wavelength bands.

A problem in design of imaging devices is the requirement for an adequate image resolution. Known imaging devices employ, typically, sensor chips comprising a photo-sensitive two-dimensional array which provides adequate resolution from say a 64×64 pixel capacity. To increase the pixel capacity of such an array from say 64×64 pixels up to 512×512 pixels, for instance, while maintaining adequate resolution, has hitherto presented difficulties to the designer.

One of the main difficulties encountered in attempting to increase pixel capacity concerns the sensor chip itself which is completely surrounded by connection circuitry. This circuitry prevents the close positioning of sensor chips in side-by-side relationship to thereby provide an increased pixel capacity array to yield the required adequate resolution image.

An aim of this invention is to provide an imaging device which overcomes the aforementioned problems and difficulties in a relatively simple, cost effective, efficient and expeditious manner.

BRIEF SUMMARY OF THE INVENTION

According to this invention there is provided an imaging device for processing an optical image in the visible and/or infra-red wavelength bands comprising an assembly including four closely associated separate optical image receiving areas, each forming a different segment of an overall optical image area corresponding to the optical image to be processed, each separate image receiving area being associated with at least one optical sensing means located on an external region only of the separate image receiving area, and associated reflection means, located within the separate image receiving area, adapted for reflecting a received optical image relating to that particular image receiving area exclusively to the associated optical sensing means, whereby in use of the device the four separate received optical images sensed by the optical sensing means are capable of being electronically processed to produce a composite image for display purposes.

Preferably each different segment is a quarter segment of the optical image area.

The reflection means may take the form of an inclined (with respect to the optical sensing means) fully reflecting surface, or either a dichroic or holographic inclined surface within a cube comprising two prisms or may be an inclined fully reflecting front surface mirror, or either a dichroic or holographic front surface mirror. In using the dichroic or holographic inclined surfaces, the optical image in one wavelength band is reflected while the optical image in another wavelength band in transmitted.

Preferably the optical sensing means comprises a photosensitive two-dimensional array in the form of a semiconductor chip comprising a plurality of pixels.

The optical sensing means may alternatively comprise a vidicon camera tube.

The pixel capacity of the array may be of the order of 64×64 pixels each pixel having a dimension of 20 to 40 micrometres square.

In one arrangement of the assembly each optical image receiving area preferably is associated with one optical sensing means for sensing the optical image in the visible wavelength band. However, in another arrangement of the assembly each image receiving area is associated with two optical sensing means, a first for sensing the optical image in one wavelength band and a second for sensing the optical image in another wavelength band.

The one wavelength band and the other wavelength band may be in different parts of the visible or infra-red regions of the spectrum or the one wavelength band may be in the visible region of the spectrum, whereas the other wavelength band may be in the infra-red region of the spectrum.

Preferably the first optical sensing means (for the four areas) are located one on each side of the assembly while the second optical sensing means are located to the rear of the assembly.

The second optical sensing means may be arranged to sense four separate segments of the four quarter segments only towards a centre region of the optical image.

The electronic processing preferably involves sequential scanning of the optical sensing means in a raster type scan by scanning control means, and may involve electronic overlaying the centre region of the optical image within the composite image.

Preferably the assembly incorporates means for mechanically improving the resolution of the optical image, said means comprising electromechanical apparatus which is synchronised for operation with the scanning control means and is adapted to move the sensing means diagonally by a distance which displaces the pixels of the associated array one half pixel separation.

The invention will be more readily understood from the following description of exemplary embodiments which should be read in conjunction with the accompanying drawings in which:

DESCRIPTION OF THE PREFERRED EMBODIMENT

Figure 1:
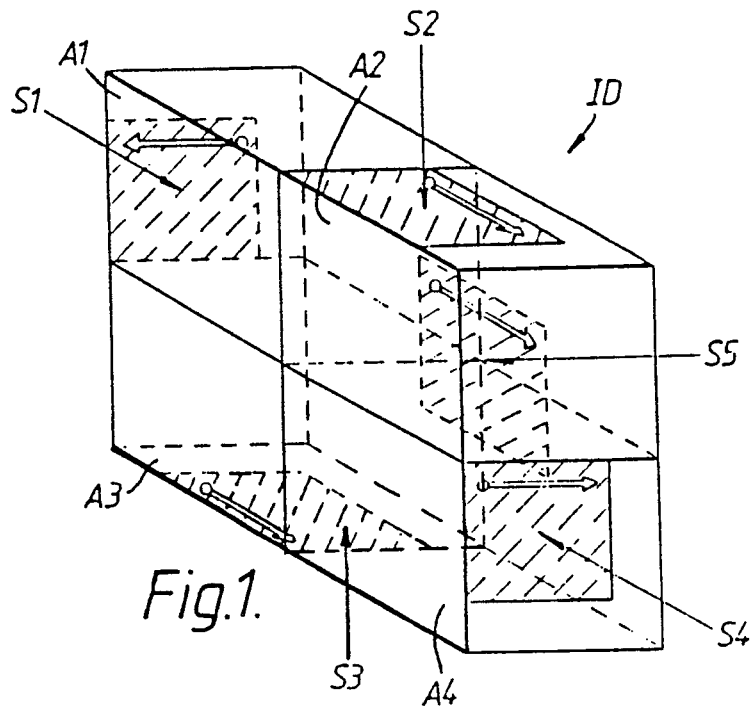
FIG. 1 illustrates a schematic diagram of the arrangement of the device in accordance with this invention.
Figure 2:
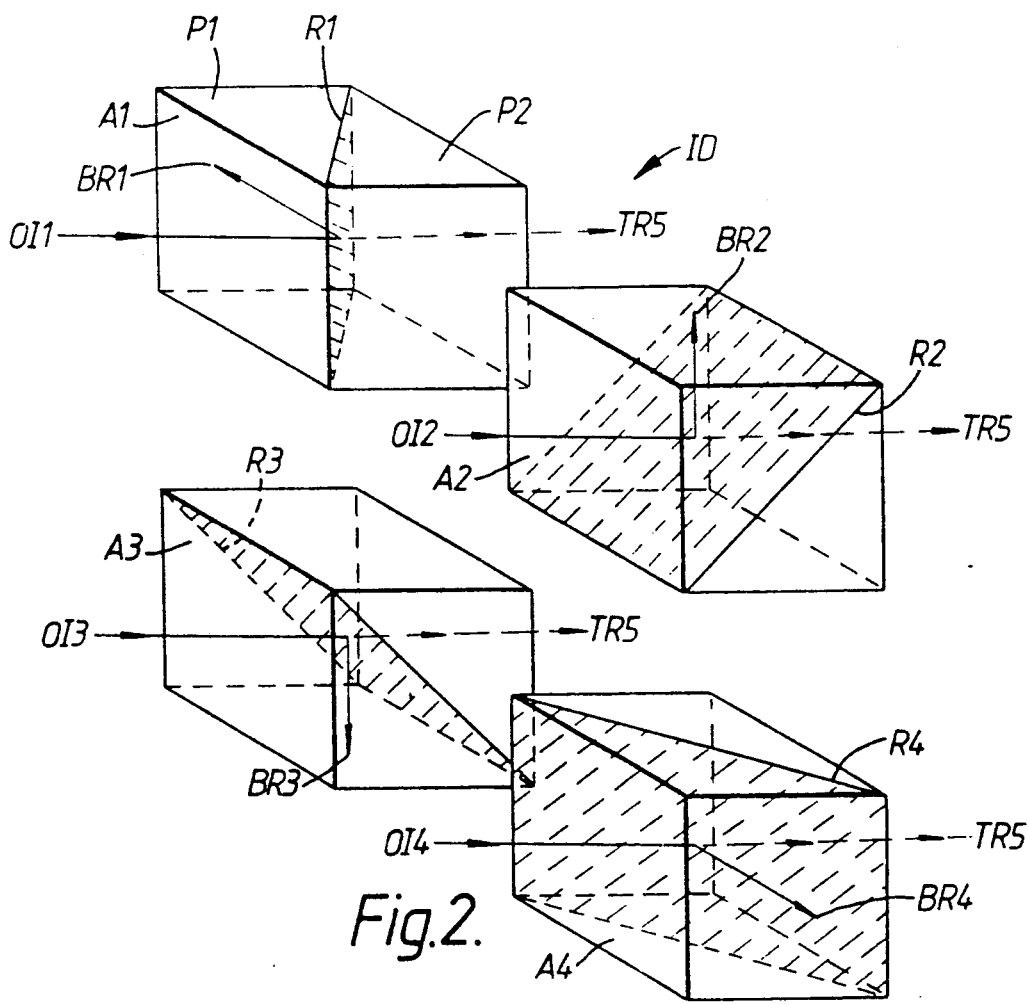
FIG. 2 illustrates a further schematic diagram of the device with the separate image receiving areas displaced for clarity to show the details of the reflection means.

Referring to the drawings, the imaging device ID comprises four separate optical image receiving areas A1, A2, A3 and A4 (see FIG. 1 and FIG. 2) each of which is a one quarter segment of an overall optical image area of an optical image represented by and comprising separate optical paths OI1, OI2, OI3 and OI4 (FIG. 2) respectively.

Each image receiving area includes an appropriately inclined reflection means R1, R2, R3 and R4 respectively which may take the following form:

a) a fully reflecting surface within a cube comprising two prisms (P1 and P2);
b) a dichroric or holographic surface within a cube comprising two prisms (P1 and P2), which allows an image of an alternative wavelength (e.g. infra-red) to be transmitted;
c) a fully reflecting front surface mirror;
d) a dichroic or holographic front surface mirror allowing an image of a different wavelength (e.g. infra-red) to be transmitted.

Each image receiving area also includes an optical sensing means S1, S2, S3 and S4 respectively which are located externally and on separate sides of the assembly at the same optical distance from the image receiving plane. Each optical sensing means comprises a photosensitive two-dimensional array manufactured in semiconductor chip form. Conveniently a single array comprises 64×64 pixels, being of the order of 20 to 40 micrometers square. It will be shown, however, that this invention is capable of producing an improved image resolution optically raised up to 128×128 pixels using four separate arrays, and then further electromechanically up to 256×256 pixels.

In operation, the various segments of the optical image are reflected, as BR1, BR2, BR3 and BR4 respectively, by the relevant inclined reflection means to an associated sensor chip. The arrangement of the sensor chips for detecting the segments of the optical image is as follows:

SENSOR CHIP S1 The top left hand segment
SENSOR CHIP S2 The top right hand segment
SENSOR CHIP S3 The bottom left hand segment
SENSOR CHIP S4 The bottom right hand segment In addition to the four sensor chips S1, S2, S3 and S4, there may be a further sensor chip S5 which is located to the rear of the assembly and positioned to sense four small separate segments of the four quarter segments in the centre of the overall optical image. This is useful when (b) and (d) options above are adopted and will cater for an overlaid image of this particular part of the optical image which is sensed at the different wavelength selectively and transmitted by the reflection means (see FIG. 2 optical path TR5). This part of the image is overlaid electronically (see FIG. 4).

It should be understood that the device is suitable for operation in the visible and/or infra-red wavelength bands of the spectrum either as a single wavelength or dual wavelength operating device. Thus, sensors S1 to S4 may operate in one wavelength band in either the visible or infra-red region of the spectrum, while the sensor S5 operates in another wavelength band in either the visible or infra-red region of the spectrum.

In operation the separate images from each quarter segment require to be processed electronically to form a composite image and the most convenient method of achieving this is by electronically scanning the sensor chips in a particular sequence as follows:

| LINE 1 | SENSOR CHIP S1 | LINE 1 | SENSOR CHIP S2 |
|---|---|---|---|
| LINE 2 | SENSOR CHIP S1 | LINE 2 | SENSOR CHIP S2 |
| — | — | — | — |
| — | — | — | — |
| — | — | — | — |
| LINE N | SENSOR CHIP S1 | LINE N | SENSOR CHIP S2 |
| LINE 1 | SENSOR CHIP S3 | LINE 1 | SENSOR CHIP S4 |
| — | — | — | — |
| — | — | — | — |
| LINE N | SENSOR CHIP S3 | LINE N | SENSOR CHIP S4 |

It will be appreciated that such a scanning sequence may be achieved by a raster scan type control. A typical electronic control arrangement is illustrated schematically in FIG. 4 where a scanner control is designated SC. Scanning signals SS1, SS2, SS3, SS4 and SS5 from the scanner SC control the scanning of the sensors S1, S2, S3, S4 and S5 respectively and the sensed optical image data is passed to a display D by way of paths DI1, DI2, DI3, DI4 and DI5 respectively.

Figure 3:
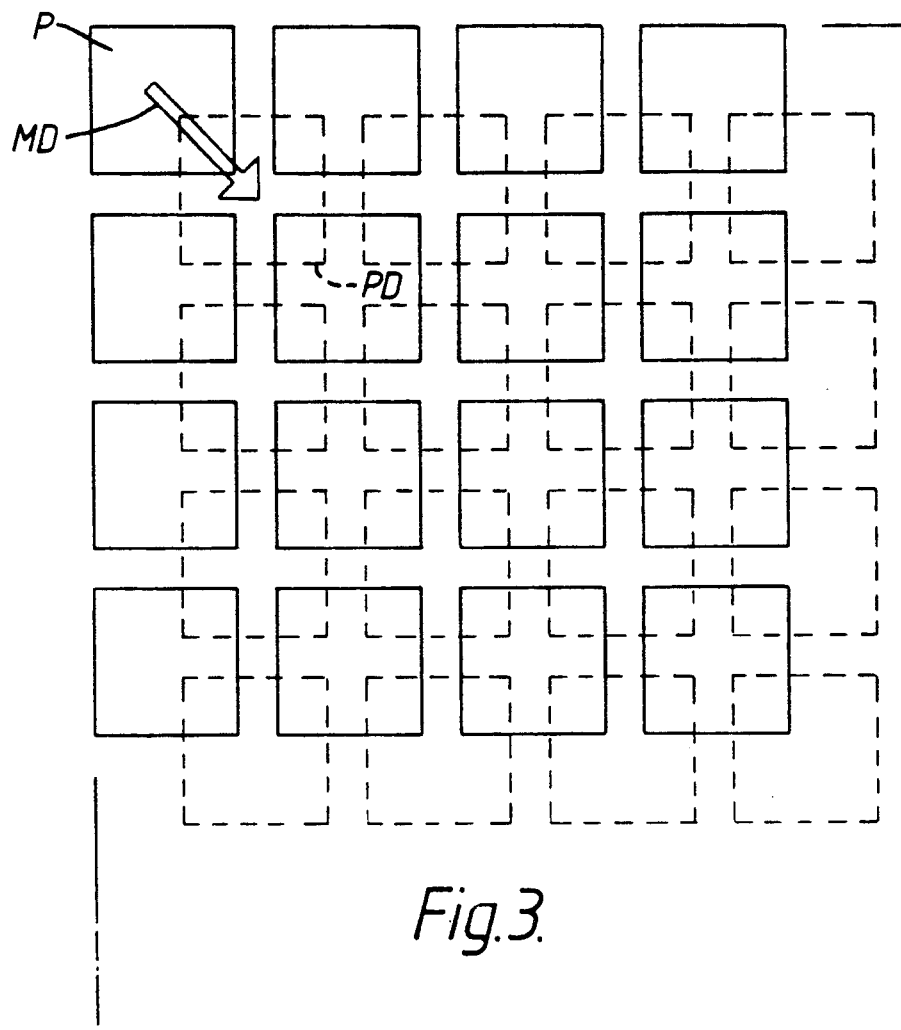
FIG. 3 illustrates the arrangement concerned with a method of mechanical diagonal displacement of pixels to provide improved image resolution; and, FIG. 4 illustrates a block schematic diagram of the associated electronic control circuitry.
Figure 4:
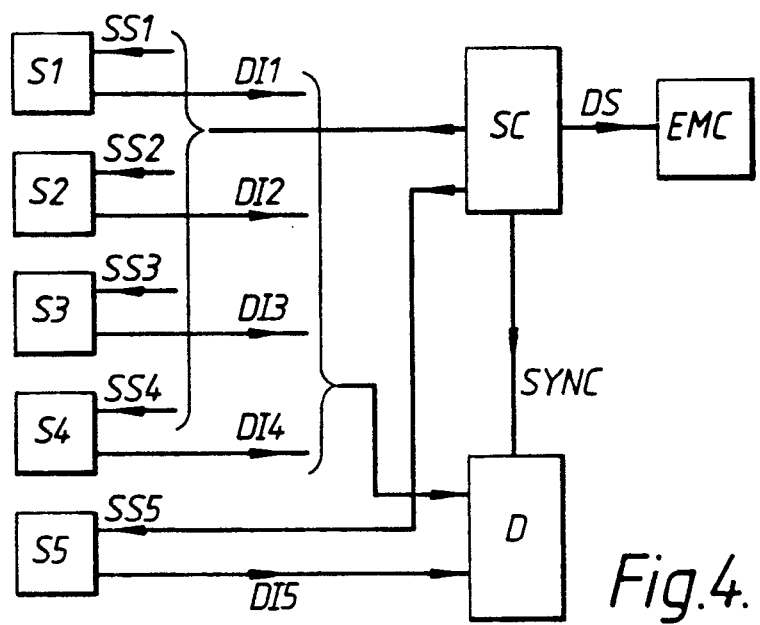

A suitable synchronising signal SYNC to synchronise the scanning sequence with the display D is passed from the scanner control SC to the display D. Referring now to FIG. 3, it has been mentioned that enhancement of the optical image can be obtained electromechanically. This is achieved by moving the sensor chip through one half pixel separation after it has been scanned, and interlacing the first and second scan. It has been found that if movement of the sensor chip is diagonal across the pixel matrix, both vertical and horizontal line resolution will be improved. If the scanning arrangement incorporates a 25 Hz framing time, sensor chips S1 and S2 will be scanned in 1/50 second. If the whole sensor chip is now displaced diagonally I (see arrow MD), by an electromechanical means EMC which is driven by a 50 Hz square wave drive signal DS from the scanner control SC as shown in FIG. 4, the pixel P is moved to the position PD, and the interlace resolution is obtained.

It will be apparent to those skilled in the art that various alternatives within the scope of this invention can be envisaged; for instance, the single sensor chip S5 while only scanning a small central area of the optical image could be replaced by a larger sensor having a greater pixel capacity thereby enabling scanning of a larger area.

In the absence of the 5th sensor, it would be possible to reconstitute the image transmitted to the rear of the assembly optically and reprocess it through a further imaging device along the lines disclosed herein. Indeed it would be possible in this manner to selectively filter the three colours red, blue and green by transmitting the optical image through successive optical image assemblies of the type disclosed herein.

Other sensors suitable for input to an electronic processing may be employed instead of an array, for example a vidicon camera tube.

What is claimed is:
1. An imaging device for processing an optical image comprising in combination;
an assembly including four adjacent separate optical image receiving units, each receiving a different segment of an overall optical image to be processed;
at least one optical sensing means associated with each separate image receiving unit, said sensing means being located on an external region only of said separate image receiving unit away from said overall optical image, each of said sensing means being located in a different plane; and,
associated reflection means, located within each of said separate image receiving units, and being adapted for reflecting the received optical image segment received by that particular image receiving unit exclusively to the associated optical sens- ing means, whereby in use of the device the four separate received optical image segments sensed by the optical sensing means are capable of being electronically processed to produce a composite image for display purposes.

2. An imaging device as claimed in claim 1, wherein each different segment is a quarter segment of said overall optical image.

3. An imaging device as claimed in claim 1, wherein each of said reflection means is inclined with respect to said optical sensing means.

4. An imaging device as claimed in claim 3, wherein each of said reflection means comprises a fully reflecting surface within each said unit, each of which is a cube comprising two prisms.

5. An imaging device as claimed in claim 3, wherein each of said reflection means comprises a dichroic surface within each said unit, each of which is a cube comprising two prisms.

6. An imaging device as claimed in claim 3, wherein each of said reflection means comprises a holographic surface within each said unit, each of which is a cube comprising two prisms.

7. An imaging device as claimed in claim 1, wherein each of said optical sensing means comprises a photosensitive two-dimensional array in the form of a semiconductor chip comprising a plurality of pixels.

8. An imaging device as claimed in claim 1, wherein each of said optical sensing means comprises a vidicon camera tube.

9. An imaging device as claimed in claim 7, wherein the pixel capacity of each of said arrays is $64 \times 64$ pixels.

10. An imaging device as claimed in claim 1, wherein each optical sensing means senses its associated optical image segment in the visible wavelength band.

11. An imaging device as claimed in claim 1 wherein each image receiving unit is associated with two optical sensing means, a first for sensing the optical image in one wavelength band and a second for sensing the optical image in another wavelength band.

12. An image device as claimed in claim 11, wherein said first and second optical sensing means sense different parts of the visible region of the spectrum, constituting said one wavelength band and said other wavelength band.

13. An imaging device as claimed in claim 11, wherein said first and second optical sensing means sense different parts of the infra-red region of the spectrum, constituting said one wavelength band and said other wavelength band.

14. An imaging device as claimed in claim 11, wherein said first and second optical sensing means sense said one wavelength band in the visible region of the spectrum, and said other wavelength band in the infra-red region of the spectrum.

15. An imaging device as claimed in claim 11, wherein said first optical sensing means is located on a side of said unit, rather than at said overall optical image.

16. An imaging device as claimed in claim 11, wherein said second optical sensing means is located on the back of said unit, at said overall optical image.

17. An imaging device as claimed in claim 11, wherein said second optical sensing means senses four separate segments of said four different segments only towards a centre region of the overall optical image.

18. An imaging device as claimed in claim 1, comprising electronic processing means involving sequential scanning of each of said optical sensing means in a raster type scan by scanning control means.

19. An imaging device as claimed in claim 17 wherein the electronic processing means further comprises electronic means for overlaying the centre region of the optical image received by said second sensing means within the composite image received by said first optical sensing means.

20. An imaging device as claimed in claim 18, wherein at least one of said sensing means comprises an array of pixels and means for mechanically improving the resolution of said sensing means, comprising electromechanical apparatus which is synchronised for operation with the scanning control means and is adapted to move said one sensing means diagonally with respect to its pixel array by a distance which displaces the pixels of its array by one half pixel.

21. An imaging device as claimed in claim 1 wherein said imaging units are identical.

22. An imaging device as claimed in claim 1 wherein said imaging units are identical cubes.

* * * * *